United States Patent
Said et al.

(10) Patent No.: US 9,459,382 B2
(45) Date of Patent: Oct. 4, 2016

(54) SURFACE MICROSTRUCTURES FOR LIGHT SHAPING REFLECTORS

(75) Inventors: Amir Said, Cupertino, CA (US); Antonius Kalker, Mountain View, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1321 days.

(21) Appl. No.: 13/174,702

(22) Filed: Jun. 30, 2011

(65) Prior Publication Data
US 2013/0003203 A1 Jan. 3, 2013

(51) Int. Cl.
*G02B 5/10* (2006.01)
*G02B 5/02* (2006.01)
*G02B 27/00* (2006.01)

(52) U.S. Cl.
CPC ........... *G02B 5/0215* (2013.01); *G02B 5/0221* (2013.01); *G02B 5/0284* (2013.01); *G02B 5/10* (2013.01); *G02B 27/0012* (2013.01); Y10T 29/49778 (2015.01)

(58) Field of Classification Search
CPC .... G02B 5/10; G02B 5/0215; G02B 5/0221; G02B 5/0284; G03B 21/60
USPC ........ 359/459, 850, 851, 868, 869, 900, 627
See application file for complete search history.

(56) References Cited

U.S. PATENT DOCUMENTS

| | | | | |
|---|---|---|---|---|
| 2,660,927 A * | 12/1953 | Burton | .................. | G03B 21/602 359/459 |
| 2,961,926 A * | 11/1960 | Hoffmeister | ..... | B29D 11/00596 359/515 |
| 2,984,152 A * | 5/1961 | Mihalakis | .............. | G03B 21/60 359/459 |
| 3,026,770 A * | 3/1962 | Smith | .................... | G03B 21/56 359/451 |
| 3,063,339 A * | 11/1962 | Mihalakis | .............. | G03B 21/60 236/21 R |
| 4,040,717 A * | 8/1977 | Cinque | .................. | G03B 21/60 359/454 |
| 4,642,469 A * | 2/1987 | Bretaudeau | ............... | F41G 7/26 250/559.31 |
| 5,132,841 A * | 7/1992 | Bennett | .................. | G02B 5/124 359/515 |
| 5,138,490 A * | 8/1992 | Hohberg | ............ | B23K 26/0738 219/121.74 |
| 5,296,965 A * | 3/1994 | Uetsuki | ................ | G03B 21/604 359/459 |
| 5,475,533 A * | 12/1995 | Steenblik | ................. | G02B 5/00 359/455 |
| 7,948,678 B1 * | 5/2011 | Poulsen | ................. | G03B 21/60 359/454 |
| 8,459,797 B2 * | 6/2013 | Kuo | ......................... | G02B 3/08 353/7 |
| 2008/0088921 A1 * | 4/2008 | Yonekubo | .............. | G03B 21/60 359/459 |
| 2009/0059365 A1 * | 3/2009 | Rickers | ................... | G02B 27/48 359/459 |
| 2009/0231696 A1 * | 9/2009 | Shinbo | ................. | G03B 21/602 359/459 |
| 2010/0027115 A1 | 2/2010 | De Boer et al. | | |
| 2010/0045897 A1 | 2/2010 | Kim et al. | | |
| 2010/0110317 A1 | 5/2010 | Chen | | |
| 2010/0208467 A1 | 8/2010 | Dross | | |
| 2010/0259818 A1 * | 10/2010 | Mikoshiba | ............. | G03B 21/60 359/459 |
| 2010/0271843 A1 | 10/2010 | Holten et al. | | |
| 2014/0022222 A1 * | 1/2014 | Kuo | ....................... | G02B 5/021 345/205 |

FOREIGN PATENT DOCUMENTS

WO  WO-2010136921  12/2010

* cited by examiner

*Primary Examiner* — Ricky D Shafer
(74) *Attorney, Agent, or Firm* — HP Inc. Patent Department

(57) ABSTRACT

A method for designing microstructures for a light shaping reflector for use in a light field display is provided. A mathematical function is derived to reflect light uniformly from an incident light beam. Curved elements shaped by the mathematical function are combined to design the microstructures. The microstructures are formed in a reflective surface to provide the light shaping reflector for use in the light field display.

4 Claims, 6 Drawing Sheets

Microscopic View

SURFACE MICROSTRUCTURES FOR LIGHT SHAPING REFLECTORS

BACKGROUND

Light field displays have emerged to provide viewers a more accurate visual reproduction of three-dimensional ("3D") real-world scenes without the need for specialized viewing glasses. Such displays emulate a light field, which represents the amount of light traveling in every direction through every point in space. The goal is to enable multiple viewers to simultaneously experience a true 3D stereoscopic effect from multiple viewpoints, by capturing a light field passing through a physical surface and emitting the same light field through a reflective display screen. Doing so has the potential to revolutionize many visual-based applications in areas as diverse as entertainment, business, medicine, and art, among others.

Light field displays typically include an optical diffuser or reflector to transform an incoming thin beam of light into a desired shape. Incident light consisting of multiple beams is spread into a range of angles to generate images representing multiple views. The tailoring of the shape depends on anisotropic reflective microstructures on the diffuser surface, such as, for example, microstructures forming a sinusoidal pattern. If the microstructures do not reflect light uniformly, the brightness of the multiple views will not be uniform. As a result, viewers may perceive some parts of the images as brighter or darker than others.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Microstructures for light shaping reflectors are disclosed. The microstructures are etched or stamped to the surface of a reflective material to form a light shaping reflector. A light shaping reflector, as generally described herein, transforms an incoming thin beam of light into another beam of light having a certain shape. In various embodiments, the microstructures are designed to generate a reflected beam having a rectangular shape with uniform illumination. The microstructures can be arranged in multiple configurations in a reflector and minimize or completely eliminate Moiré patterns and other artifacts in the reflected light. The reflector may be incorporated in a light field display to generate three dimensional images having uniform brightness.

It is appreciated that, in the following description, numerous specific details are set forth to provide a thorough understanding of the embodiments. However, it is appreciated that the embodiments may be practiced without limitation to these specific details. In other instances, well known methods and structures may not be described in detail to avoid unnecessarily obscuring the description of the embodiments. Also, the embodiments may be used in combination with each other.

Figures 1A, 1B:
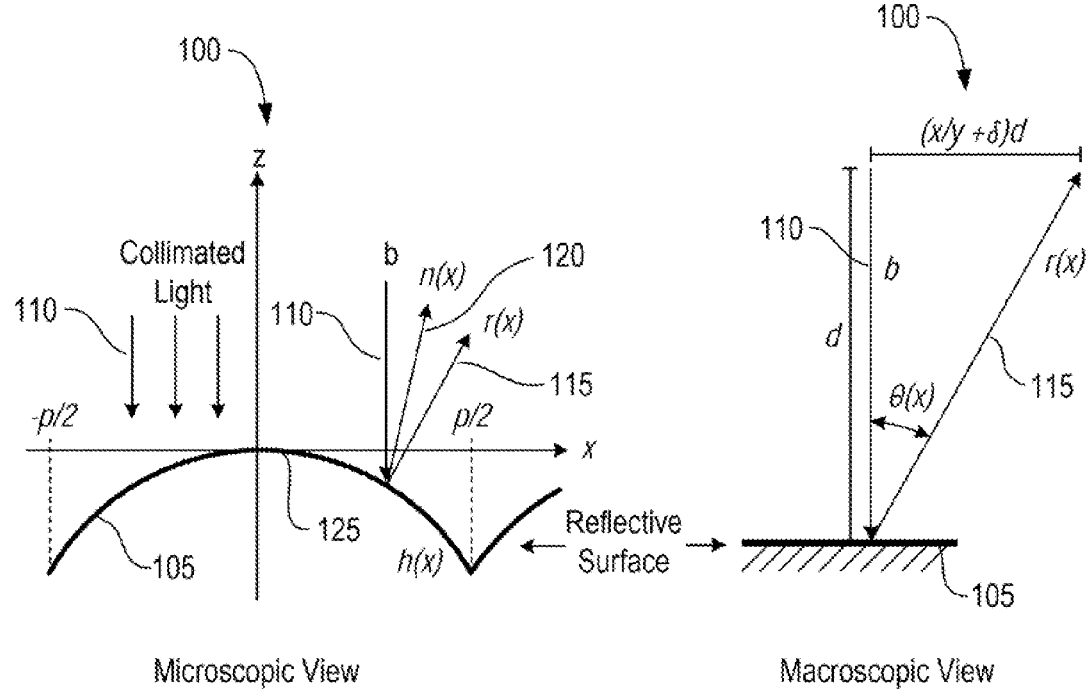
FIGS. 1A-B illustrate schematic diagrams of an example two-dimensional light shaping reflector in accordance with various embodiments.

Referring now to FIGS. 1A-B, schematic diagrams of an example two-dimensional light shaping reflector in accordance with various embodiments are described. Light shaping reflector 100 has a series of microstructures 105 formed (e.g., by etching or stamping) in a reflective surface. The microstructures 105 consist of curved elements 125 defined by a mathematical function h(x) and repeated with a pitch p. The function h(x) governs the shape of the microstructures 105 and dictates how an incoming beam of uniform light 110 will be reflected in a ray r(x) 115. As described below for various embodiments, the function h(x) is determined to guarantee that the reflected light will be uniform within a certain angle range.

To simplify notation, it is assumed that one of the curved elements in microstructures 105 is centered at x=0. Further, it is also assumed that the reflector 100 is near the plane z=0, that the microstructures 105 only change the shape of the reflective surface along the x direction, and the reflective material forming the reflector 100 is perfectly flat along the y direction. It is also assumed that the reflector 100 is illuminated by a locally uniform incident beam of collimated light 110, that is, the incident light beam 110 is assumed to be uniform at least at a close (e.g., microscopic) distance away from the reflective surface. The direction of the incident light beam 110 can be given by:

$$b = \begin{bmatrix} 0 \\ 0 \\ -1 \end{bmatrix} \quad \text{(Eq. 1)}$$

According to the physics law of reflection, the direction of the reflected light ray r(x) 115 can be computed based on the direction of the incident light beam 110 in Eq. 1 and the direction of a normal vector n(x) 120 with direction normal to the reflective surface. The direction of the normal vector, as shown in FIG. 1A, can be computed by:

$$n(x) = \begin{bmatrix} -h(x) \\ 0 \\ -1 \end{bmatrix} \quad \text{(Eq. 2)}$$

where h'(x) is the derivative of the function h(x) that defines the shape profile of the microstructures 105, that is:

$$h'(x_0) = \frac{dh(x)}{dx}\bigg|_{x=x_0} \quad \text{(Eq. 3)}$$

With these definitions, the vector representing the reflected light r(x) can therefore be computed as follows:

$$r(x) = b - \frac{2b^T n(x)}{n^T(x)n(x)} n(x) = \begin{bmatrix} 0 \\ 0 \\ -1 \end{bmatrix} + \frac{2}{1+[h'(x)]^2} \begin{bmatrix} -h'(x) \\ 0 \\ 1 \end{bmatrix} \quad \text{(Eq. 4)}$$

As described above, the microstructures 105 are designed to reflect light uniformly within a certain angle range, as shown in the macroscopic view of FIG. 1B. To do so, for a given incident light ray 110 with direction b and reaching the reflector 100 at a position $x \in (-p/2, p/2)$, the angular deviation of the reflected ray $r(x)$ 115, when reaching a screen at a distance d from the reflective surface of the reflector 100, should be an affine function of x, that is:

$$\theta(x) = \arccos(-b^T r(x)) = \arctan(x/\gamma + \delta) \qquad \text{(Eq. 5)}$$

where $\delta$ and $\gamma$ are scaling factors.

Assuming that $h(x)$ has even symmetry, and defining the maximum deflection angle as $\theta_{max} \le \pi/4$, results in:

$$\theta(0) = 0 \Rightarrow \delta = 0 \qquad \text{(Eq. 6)}$$

$$\theta(p/2) = \theta_{max} \Rightarrow \gamma = p/[2\tan(\theta_{max})] \qquad \text{(Eq. 7)}$$

It is interesting to separate the definition of the basic shape of the microstructures 105 given by the function $h(x)$ from their actual size. To do so, the microstructures 105 can have their shape defined by a scaled function $f(u)$, where $u \in [-1, 1]$, such that:

$$u = x/\gamma, h(x) = \gamma f(x/\gamma) \qquad \text{(Eq. 8)}$$

The derivative of this function $f(u)$ is given by:

$$g(u_0) = \left. \frac{df(u)}{du} \right|_{u=u_0} \qquad \text{(Eq. 9)}$$

With this new notation, the condition that the reflected light direction $r(x)$ in Eq. 4 satisfies Eq. 5 above corresponds to:

$$\alpha \begin{bmatrix} u(d-\gamma) \\ 0 \\ d + \gamma f(u/\gamma) \end{bmatrix} = \begin{bmatrix} 0 \\ 0 \\ -1 \end{bmatrix} + \frac{2}{1+g^2(u)} \begin{bmatrix} -g(u) \\ 0 \\ 1 \end{bmatrix} \qquad \text{(Eq. 10)}$$

where $\alpha$ is a scaling factor that is introduced to reflect that the vector in the left side of the equation should have the same direction as the vector on the right.

Distance d is much larger than $\gamma$ (commonly by at least four orders of magnitude as the microstructures 105 are designed to be small relative to the distance d), Eq. 10 may be simplified as:

$$\alpha \begin{bmatrix} ud \\ 0 \\ d \end{bmatrix} = \begin{bmatrix} 0 \\ 0 \\ -1 \end{bmatrix} + \frac{2}{1+g^2(u)} \begin{bmatrix} -g(u) \\ 0 \\ 1 \end{bmatrix} \qquad \text{(Eq. 11)}$$

Solving for $\alpha$ results in the following quadratic equation:

$$u g^2(u) - 2g(u) - u = 0 \qquad \text{(Eq. 12)}$$

To avoid numerical instability and solve for cases when $x \approx 0$, the following formula is considered for possible solutions:

$$-\frac{u}{1 \pm \sqrt{1+u^2}} \qquad \text{(Eq. 13)}$$

The desired solution is the one with the smallest magnitude (i.e., the nearest), which is given by:

$$g(u) = -\frac{u}{1+\sqrt{1+u^2}} \qquad \text{(Eq. 14)}$$

The shape of a continuous reflective surface is obtained by solving the differential equation defined by the normal vectors, which in this case is done by simple integration. With the initial condition $g(0) = 0$, the solution for $u \in [-1, 1]$ is equal to:

$$f(u) = \int_0^u g(t) dt = 1 - \sqrt{1+u^2} + \ln\left(\frac{1+\sqrt{1+u^2}}{2}\right) \qquad \text{(Eq. 15)}$$

The desired function $h(x)$ governing the shape of the microstructures 105 and dictating how an incoming beam of uniform light 110 will be uniformly reflected in a ray $r(x)$ 115 is thus obtained by plugging in Eq. 15 into Eq. 8, resulting in:

$$h(x) = \gamma\left(1 - \sqrt{1+(x/\gamma)^2} + \ln\left(\frac{1+\sqrt{1+(x/\gamma)^2}}{2}\right)\right) \qquad \text{(Eq. 16)}$$

Figure 2:
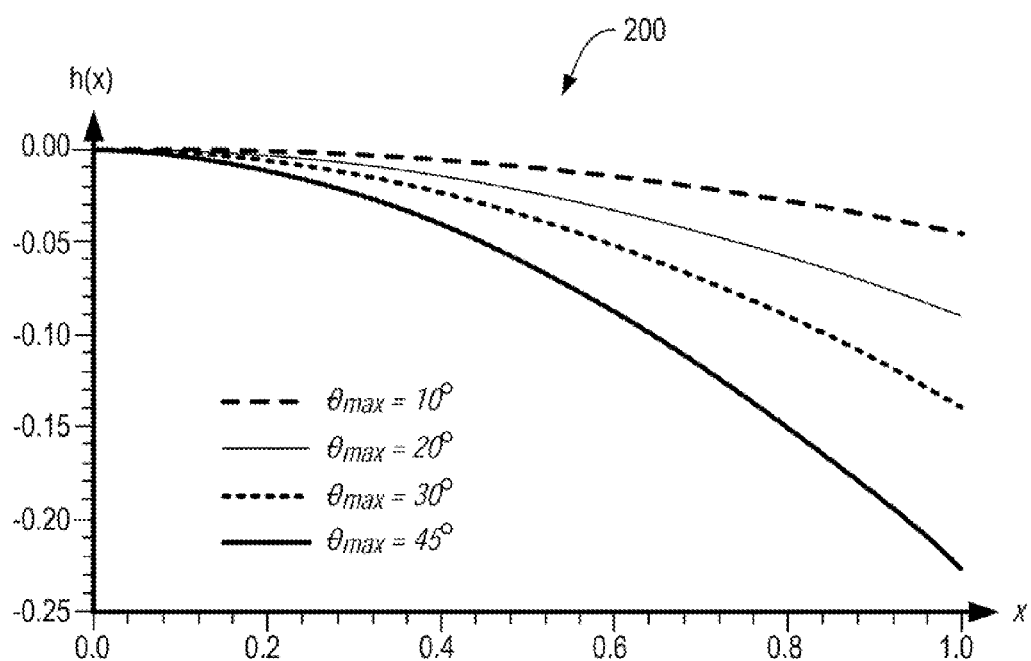
FIG. 2 illustrates the shape of two-dimensional microstructures for different values of a maximum reflection angle.

Attention is now directed to FIG. 2, which illustrates the shape of the microstructures 105 for different values of a maximum reflection angle. From Eq. 7, the scaling factor $\gamma$ can be replaced by the maximum reflection angle in Eq. 16, resulting in:

$$h(x) = \gamma\left(1 - \sqrt{1+(x/(p\arctan(\theta_{max})/2))^2} + \ln\left(\frac{1+\sqrt{1+(x/(p\arctan(\theta_{max})/2))^2}}{2}\right)\right) \qquad \text{(Eq. 17)}$$

Figure 3:
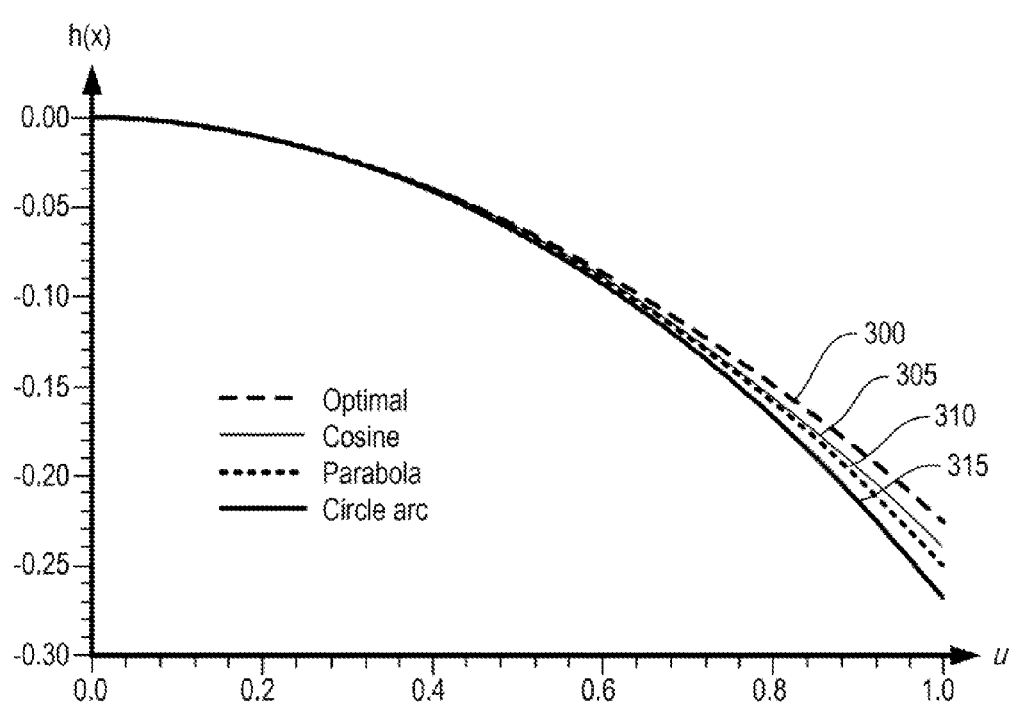
FIG. 3 illustrates the optimal shape of two-dimensional microstructures as compared to the shape of common mathematical functions.

Graph 200 shows $h(x)$ for different values of $\Theta_{max}$. The shape of the function $h(x)$ is slightly more tapered off than other mathematical functions such as the cosine, parabola, and circle arc functions. FIG. 3 shows the $h(x)$ function in curve 300, the cosine in curve 305, the parabola in curve 310, and the circle arc in curve 315.

As appreciated by one skilled in the art, the microstructures 105 may be formed of curved elements defined by the mathematical function $h(x)$ and repeated with a pitch p. FIGS. 2-3 show that the shape of the curved elements is convex. However, it is also appreciated that alternative implementations of the microstructures 105 can be accomplished using the same shape definition, as illustrated in FIGS. 4A-4D.

Figure 4A:
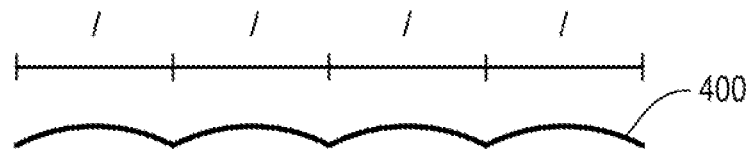
FIGS. 4A-4D show example two-dimensional microstructures having the same reflective pattern as the mathematical function h(x)
Figure 4B:
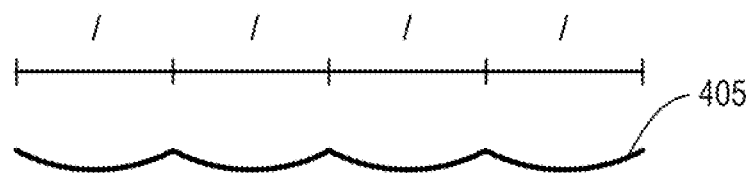
Figure 4C:
Figure 4D:
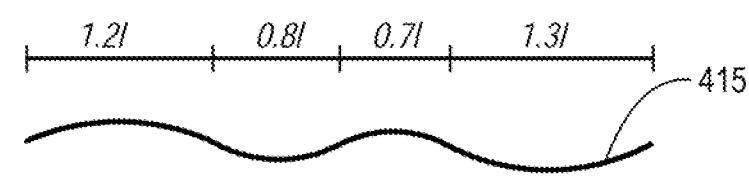

FIGS. 4A-4D show example two-dimensional microstructures with the same reflective pattern as the mathematical function $h(x)$. In FIG. 4A, microstructures 400 are convex like the function $h(x)$ with a pitch of $p=1$. FIG. 4B shows an alternative implementation, where the microstructures 405 have concave shapes but the same distribution of normal vectors and thus the same uniform reflective effect as the microstructures 400 in FIG. 4A. FIG. 4C combines the implementations shown in FIGS. 4A-B with convex and concave curved elements forming the microstructures 410 and hence eliminating discontinuities in the derivative of function $h(x)$ (or, equivalently, jumps in the direction of the surface normal). And FIG. 4D shows an example where the curved elements in the microstructures 415 have the same basic shape, but at different scales. Depending on the size of the curved elements in the microstructures 415, this arrangement can be useful to substantially reduce or completely eliminate Moiré patterns and other artifacts in the uniform reflected light.

The above discussion focused on designing two-dimensional microstructures that reflect light uniformly while reducing or eliminating Moiré patterns and other artifacts on the reflected light. As appreciated by one skilled in the art, three-dimensional microstructures can also be designed similarly to the two-dimensional case. For three-dimensional microstructures, it is assumed that their shape is defined by a function h(x,y) that is expressed in terms of a scaled function $f(u,v)$ as follows:

$$u=x/\gamma, v=y/\gamma, h(x,y)=\gamma f(x/\gamma, y/\gamma) \qquad \text{(Eq. 18)}$$

Taking the partial derivatives of the scaled function $f$ and defining them in terms of a function g(x,y), results in:

$$g_u(u_0, v_0) = \frac{\partial f(u, v_0)}{\partial x}\bigg|_{u=u_0},\qquad \text{(Eq. 19)}$$

$$g_v(u_0, v_0) = \frac{\partial f(u_0, v)}{\partial x}\bigg|_{v=v_0}$$

The equation corresponding to Eq. 11 in the three-dimensional case is therefore:

$$\alpha \begin{bmatrix} ud \\ vd \\ d \end{bmatrix} = \begin{bmatrix} 0 \\ 0 \\ -1 \end{bmatrix} + \frac{2}{1+g_u^2(u,v)+g_v^2(u,v)} \begin{bmatrix} -g_u(u,v) \\ -g_v(u,v) \\ 1 \end{bmatrix} \qquad \text{(Eq. 20)}$$

which results in the following system of equations:

$$ug_u^2(u,v)+ug_v^2(u,v)-2g_u(u,v)-u=0 \qquad \text{(Eq. 21)}$$

$$vg_u^2(u,v)+vg_v^2(u,v)-2g_v(u,v)-v=0 \qquad \text{(Eq. 22)}$$

Considering the symmetry of Eq. 21 and Eq. 22, it can be expressed that:

$$vg_u(u,v)=ug_v(u,v) \qquad \text{(Eq. 23)}$$

which results in the partial derivative solutions as follows:

$$g_u(u,v) = -\frac{u}{1+\sqrt{1+u^2+v^2}} \qquad \text{(Eq. 24)}$$

$$g_v(u,v) = -\frac{v}{1+\sqrt{1+u^2+v^2}} \qquad \text{(Eq. 25)}$$

The continuous three-dimensional solution for the surface shape is therefore given by:

$$f(u,v) = 1 - \sqrt{1+u^2+v^2} + \ln\left(\frac{1+\sqrt{1+u^2+v^2}}{2}\right) \qquad \text{(Eq. 26)}$$

Similarly to the two-dimensional case, the desired function h(x,y) governing the shape of three-dimensional microstructures for use in a light field display for reflecting light uniformly is thus obtained by plugging in Eq. 26 into Eq. 18, resulting in:

$$h(x,y) = \qquad \text{(Eq. 27)}$$
$$\gamma(1-\sqrt{1+(x/\gamma)^2+(y/\gamma)^2} + \ln\left(\frac{1+\sqrt{1+(x/\gamma)^2+(y/\gamma)^2}}{2}\right)$$

It is appreciated that light field displays may require the spread in the vertical direction to be much wider than in the horizontal direction. In this case, the function h(x,y) in Eq. 27 can be used to design microstructures for a reflector in the display by using a hybrid approach, similar to that shown in FIG. 4D above. That is, curved elements of different sizes and convexity and concavity with their shape contour defined by Eq. 27 can be combined to form optimal microstructures for an optimal reflector that reflects light uniformly and significantly reduces or completely eliminates Moiré patterns and other artifacts on the reflected light.

Figure 5:
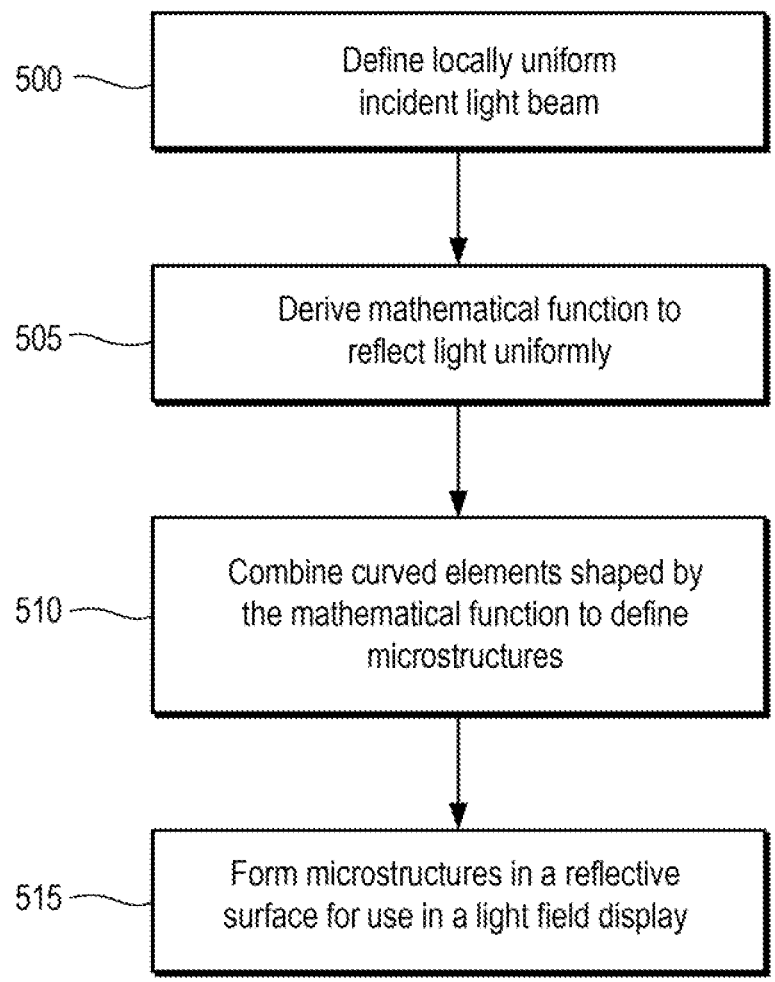
FIG. 5 is a flowchart for designing optimal microstructures for a light field display.

Referring now to FIG. 5, a flowchart for designing optimal microstructures for a light field display is described. First, an incident light beam is defined to be locally uniform close to the microstructures (500). Then, a mathematical function h(x,y) is derived to reflect light uniformly given the locally uniform incident light beam (505). Lastly, curved elements following the shape of the mathematical function are combined to define the microstructures (510) and the microstructures are etched or stamped in a reflective surface for use in a light field display (515).

As appreciated by one skilled in the art, the curved elements can have the same or different sizes, and be convex or concave. It is also appreciated that natural imperfections in the surface of different reflective materials used for the reflective surface can enable a very limited spread in the horizontal direction that is uniform and has the shape of a normal (i.e., Gaussian) distribution, which can be very suitable for light field displays.

Figure 6:
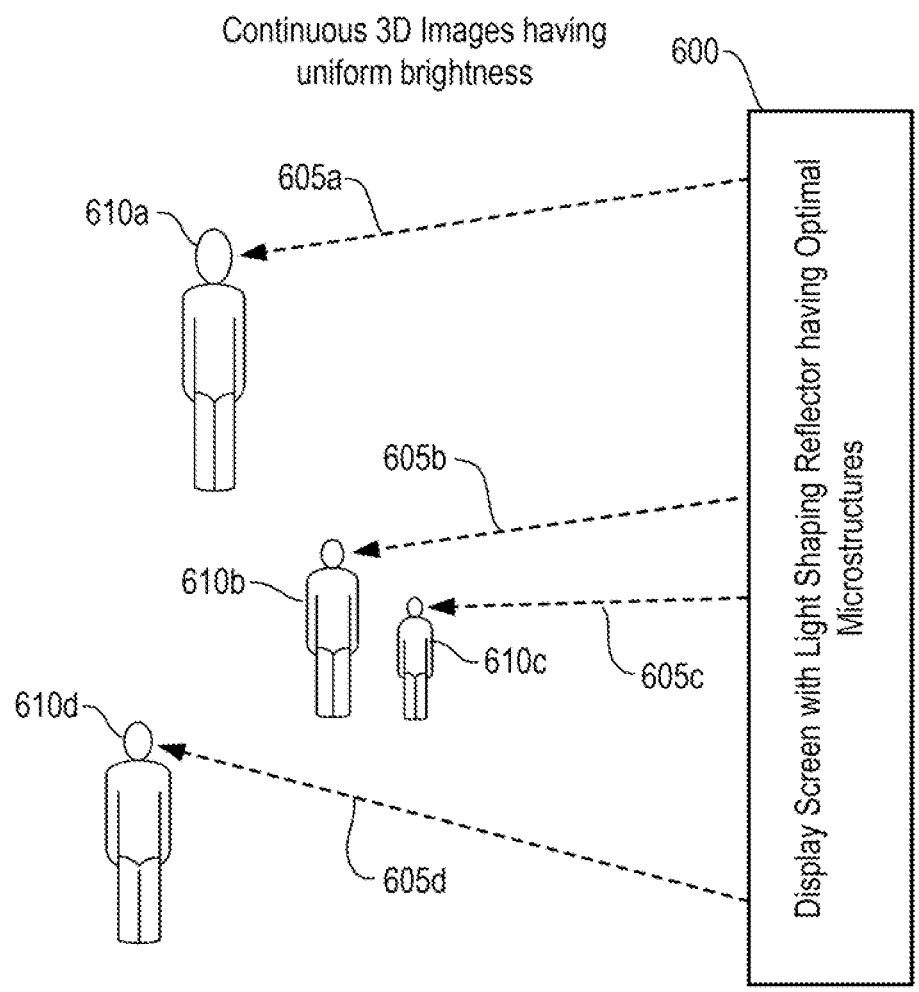
FIG. 6 illustrates a display screen having a light shaping reflector with optimally designed microstructures in accordance with various embodiments.

Referring now to FIG. 6, a display screen having a light shaping reflector with optimally designed microstructures in accordance with various embodiments is illustrated. Display screen 600 is a display screen having a light shaping reflector with optimally designed microstructures to provide continuous. 3D images to viewers (e.g., continuous 3D images 605a-d to viewers 610a-d) without requiring the use of special viewing glasses. The optimally designed microstructures have curved elements with a shape defined by a mathematical function (e.g., the h(x,y) function in Eq. 27) that guarantees that the light reflected from the display 600 will be uniform and devoid of Moiré patterns or other artifacts. As a result, viewers of display screen 600 (who may be of different heights and located at different positions relative to the display screen 600) will perceive 3D images having uniform brightness without undesirable artifacts.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein. For example, it is appreciated that the present disclosure is not limited to a particular microstructure configuration, such as those shown in FIGS. 4A-D.

What is claimed is:

1. A light shaping reflector for use in a light field display, the light shaping reflector comprising:
   a reflective surface; and
   a plurality of microstructures formed in the reflective surface, the microstructures defined by a mathematical function to reflect light uniformly from an incident light beam, wherein the microstructures comprise convex and concave curved elements, the convex curved elements being convex when facing the incident light beam, and the concave curved elements being concave when facing the incident light beam, and the convex and concave curved elements comprise:
a first convex curved element having a first size,
a first concave curved element having a second size different from the first size,
a second convex curved element having a size different from the first size, and
a second concave curved element having a size different from the second size.

2. The light shaping reflector of claim 1, wherein the incident light beam is locally uniform close to the microstructures.

3. The light shaping reflector of claim 1, wherein the mathematical function is derived from a scaled function.

4. The light shaping reflector of claim 1, wherein the mathematical function comprises a function given by $$h(x, y) = \gamma(1 - \sqrt{1 + (x/\gamma)^2 + (y/\gamma)^2} + \ln\left(\frac{1 + \sqrt{1 + (x/\gamma)^2 + (y/\gamma)^2}}{2}\right)$$

where $\gamma$ is a scaling factor, and x and y represent different directions.

* * * * *